US012800036B2

(12) United States Patent
Jordan et al.

(10) Patent No.: US 12,800,036 B2
(45) Date of Patent: Nov. 17, 2026

(54) LOW TORQUE VALVE

(71) Applicant: HELLA GMBH & CO. KGAA, Lippstadt (DE)

(72) Inventors: Nicholas Jordan, Dexter, MI (US); Dennis Burke, Canton, MI (US); Rajeevkumar Pancholi, Northville, MI (US)

(73) Assignee: HELLA GMBH & CO. KGAA, Lippstadt (DE)

( * ) Notice: Subject to any disclaimer, the term of this patent is extended or adjusted under 35 U.S.C. 154(b) by 99 days.

(21) Appl. No.: 18/074,876

(22) Filed: Dec. 5, 2022

(65) Prior Publication Data

US 2024/0183453 A1 Jun. 6, 2024

(51) Int. Cl.
*F16K 5/02* (2006.01)
*F16K 11/083* (2006.01)

(52) U.S. Cl.
CPC .......... *F16K 5/0242* (2013.01); *F16K 5/0271* (2013.01); *F16K 11/0833* (2013.01)

(58) Field of Classification Search
CPC ........ F16K 5/0242; F16K 5/161; F16K 5/162; F16K 5/167; F16K 5/0271; F16K 11/0833; F16K 11/08–0876; F16K 11/044; F16K 5/00–227; F16K 5/182; F16K 5/185; F16K 5/202; F16K 5/204; F16K 5/165; F16K 5/166; F16K 31/041; F16K 31/043; F16K 31/055; F16K 17/406; F16K 17/403; F16K 5/184; F16K 5/02; Y10T 137/86871; Y10T 137/8782; Y10T 137/4421; A61B 1/0068
USPC ................ 251/157–159, 160–163, 170–174, 251/180–185, 192, 251–262, 313, 388, 251/312; 137/625.41, 876
See application file for complete search history.

(56) References Cited

U.S. PATENT DOCUMENTS

| | | | | | |
|---|---|---|---|---|---|
| 31,799 | A * | 3/1861 | Graham | F16K 5/166 | 74/504 |
| 255,895 | A * | 4/1882 | Starbuck | F25B 9/004 | 62/403 |
| 307,209 | A * | 10/1884 | Marshall | F16K 5/184 | 251/163 |
| 419,471 | A * | 1/1890 | Nugent | F16K 5/166 | 251/360 |
| 454,661 | A * | 6/1891 | Pattee | F16K 5/184 | 251/163 |
| 582,252 | A * | 5/1897 | Ashley | F16K 5/162 | 251/166 |
| 733,905 | A * | 7/1903 | Erdman | F16K 5/166 | 251/188 |

(Continued)

*Primary Examiner* — Craig J Price
(74) *Attorney, Agent, or Firm* — WARNER NORCROSS + JUDD LLP

(57) ABSTRACT

A low torque rotary valve for a vehicle cooling system is provided. The rotary valve includes a tapered valve body that can be lifted during rotation and thereafter seated after being rotated the desired amount. An axial surface of the tapered valve body is in sliding contact with an axial surface of a valve housing or a rotatable disk. As the tapered valve body rotates, one or more ramped projections cause the tapered valve body to displace axially within the valve housing. The sealing members are uncompressed during rotation of the tapered valve body, and a lower torque demand is required, thereby allowing for a smaller and less costly motor actuator.

8 Claims, 8 Drawing Sheets

(56) References Cited

U.S. PATENT DOCUMENTS

| | | | | | |
|---|---|---|---|---|---|
| 749,750 | A * | 1/1904 | Rylands | B62D 5/083 | 251/192 |
| 1,010,149 | A * | 11/1911 | Kahle | F16K 5/162 | 251/164 |
| 1,120,594 | A * | 12/1914 | Carbis et al. | F16K 5/184 | 251/163 |
| 1,518,606 | A * | 12/1924 | Sheafe | F16K 5/0271 | 29/890.12 |
| 1,558,979 | A * | 10/1925 | Guillery | F16K 5/162 | 137/625.43 |
| 1,570,990 | A * | 1/1926 | Bottner | F16K 5/204 | 251/248 |
| 1,578,383 | A * | 3/1926 | Bayles | B25D 9/16 | 251/297 |
| 1,650,312 | A * | 11/1927 | Wildin | F16K 5/0271 | 251/163 |
| 1,758,727 | A * | 5/1930 | Wildin | F16K 5/0271 | 74/528 |
| 1,923,295 | A * | 8/1933 | Carpenter | F16K 5/222 | 137/246.19 |
| 1,966,807 | A * | 7/1934 | Sweet | F16K 5/0271 | 251/163 |
| 1,994,618 | A * | 3/1935 | Nordstrom | F16K 5/222 | 184/45.1 |
| 2,086,946 | A * | 7/1937 | Rick | F16K 5/222 | 137/246.19 |
| 2,119,024 | A * | 5/1938 | Pierce | B65H 23/18 | 74/69 |
| 2,129,231 | A * | 9/1938 | Parker | F16K 11/0856 | 137/625.29 |
| 2,152,810 | A * | 4/1939 | Mcfarlane | F16K 5/162 | 251/248 |
| 2,179,684 | A * | 11/1939 | Brown | F16K 5/162 | 251/163 |
| 2,222,626 | A * | 11/1940 | Mueller | F16K 5/162 | 251/163 |
| 2,247,296 | A * | 6/1941 | Holtam | F16K 5/162 | 251/355 |
| 2,261,596 | A * | 11/1941 | Stroobants | F24D 19/0002 | 165/DIG. 126 |
| 2,282,313 | A * | 5/1942 | Hershey | A23G 9/48 | 137/605 |
| 2,308,300 | A * | 1/1943 | Parker | F16K 5/162 | 251/163 |
| 2,323,421 | A * | 7/1943 | Reed | F16K 5/222 | 137/246.13 |
| 2,354,864 | A * | 8/1944 | Kerr | F16K 5/222 | 303/56 |
| 2,459,682 | A * | 1/1949 | Carrie | F16K 5/162 | 251/163 |
| 2,510,494 | A * | 6/1950 | Bowan | F16K 5/025 | 251/163 |
| 2,529,544 | A * | 11/1950 | Ebert | F16K 5/162 | 251/162 |
| 2,606,737 | A * | 8/1952 | Tratzik | F16K 5/222 | 137/246.11 |
| 2,625,363 | A * | 1/1953 | Waldron | F16K 5/162 | 251/160 |
| 2,662,722 | A * | 12/1953 | Graziano | F16K 5/162 | 277/391 |
| 2,702,050 | A * | 2/1955 | Thomas | F16K 31/52466 | 251/162 |
| 2,767,729 | A * | 10/1956 | Mueller | F16K 5/166 | 137/246.19 |
| 3,038,695 | A * | 6/1962 | Wildern | F16K 5/166 | 251/181 |
| 3,090,594 | A * | 5/1963 | Floyd | F16K 5/0264 | 251/317 |
| 3,450,383 | A * | 6/1969 | Leverett | F16K 11/0833 | 251/165 |
| 3,479,006 | A * | 11/1969 | Brown | F16K 5/184 | 251/336 |
| 3,815,870 | A * | 6/1974 | Milleville | F16K 5/166 | 251/181 |
| 3,840,048 | A * | 10/1974 | Moen | F16K 11/085 | 251/363 |
| 3,943,959 | A * | 3/1976 | Kirkland | F16K 27/067 | 251/315.13 |
| 4,150,694 | A * | 4/1979 | Halpine | F16K 11/0833 | 251/192 |
| RE30,224 | E * | 3/1980 | Ortega | F16K 11/085 | 137/625.43 |
| 4,272,057 | A * | 6/1981 | Haugland | F16K 5/0626 | 251/315.08 |
| 4,345,738 | A * | 8/1982 | Ripert | F16K 5/0673 | 251/315.08 |
| 4,442,996 | A * | 4/1984 | Erwin | F16K 5/0242 | 251/188 |
| 4,911,408 | A * | 3/1990 | Kemp | F16K 5/0673 | 251/315.08 |
| 4,928,725 | A * | 5/1990 | Graves | F16K 15/03 | 251/192 |
| 4,958,082 | A * | 9/1990 | Makinouchi | G03F 7/70691 | 250/548 |
| 5,004,005 | A * | 4/1991 | Graves | F16K 5/0605 | 251/192 |
| 5,127,628 | A * | 7/1992 | Kemp | F16K 5/0647 | 251/304 |
| 5,727,771 | A * | 3/1998 | Chang-Hong | F16K 5/166 | 251/184 |
| 6,308,739 | B1 * | 10/2001 | Barbuto | F16K 5/0478 | 137/625.11 |
| 6,367,774 | B1 * | 4/2002 | Haines | F16K 5/0647 | 251/315.04 |
| 6,708,948 | B2 * | 3/2004 | Nosel | F16K 17/40 | 251/312 |
| 7,174,913 | B2 * | 2/2007 | Albizuri | F24C 3/12 | 251/297 |
| 8,276,833 | B2 * | 10/2012 | Cheng | E03C 1/0409 | 239/443 |
| 9,833,128 | B2 * | 12/2017 | Brommersma | F16K 27/062 | |
| 9,958,082 | B2 * | 5/2018 | Yu | F16K 31/041 | |
| 11,592,115 | B2 * | 2/2023 | Kostański | F16K 11/0836 | |
| 11,644,112 | B2 * | 5/2023 | Gray | F16K 5/0264 | 251/309 |
| 11,662,032 | B2 * | 5/2023 | Boecker | F16K 11/0836 | 137/625.47 |
| 12,146,590 | B2 * | 11/2024 | Minton, Jr. | F16K 37/0058 | |
| 2011/0198525 | A1 * | 8/2011 | Yu | F16K 11/0833 | 251/309 |
| 2015/0137018 | A1 | 5/2015 | Russell | | |
| 2017/0152957 | A1 | 6/2017 | Roche et al. | | |
| 2024/0301957 | A1 * | 9/2024 | Minton, Jr. | F16K 37/0058 | |

* cited by examiner

LOW TORQUE VALVE

FIELD OF THE INVENTION

The present invention relates to rotary valves, and in particular, multi-port rotary valves for controlling coolant flow in battery electric vehicles and for other applications.

BACKGROUND OF THE INVENTION

Battery electric vehicles rely on complex cooling circuits to ensure the vehicle batteries, power electronics, and the electric motor are operating within an optimal temperature range. These cooling circuits typically include several multi-port rotary valves to help meet the cooling demands of these and other vehicle systems. For example, existing battery electric vehicles include one or more five-port or eight-port rotary valves that direct the flow of coolant to a corresponding number of different routing paths of the vehicle cooling system.

Multi-port rotary valves generally include a valve body that is rotated within a flow passage about an axis that is normal to a flow stream. The valve body can include a number of possible geometries, including tapered and cylindrical plugs, with each such plug defining one or more flow passages therethrough. The valve body can be rotated in the clockwise and/or counter-clockwise directions in response to a motor actuator to thereby open or close the rotary valve.

The sealing ability (leakage rate) of a rotary valve having a tapered valve body is proportional to the torque demand on the motor actuator. To achieve a high sealing ability, high power motor actuators are ordinarily required. In vehicle cooling systems, however, it can be desirable to have a smaller motor actuator, which would decrease the cost associated with the coolant system while also minimizing size and potentially extending service life. Accordingly, there remains a continued need for a multi-port rotary valve that is compatible with low torque motor actuators while maintaining a strong seal of the tapered valve body.

SUMMARY OF THE INVENTION

A low torque rotary valve for a vehicle cooling system is provided. The rotary valve includes a tapered valve body that can be lifted during rotation and thereafter seated after being rotated the desired amount. An axial surface of the tapered valve body is in sliding contact with an axial surface of a valve housing or a rotatable disk. As the tapered valve body rotates, one or more ramped projections cause the tapered valve body to displace axially within the valve housing. Sealing members are uncompressed during rotation of the tapered valve body, and a lower torque demand is required, thereby allowing for a smaller and less costly motor actuator.

In one embodiment, the rotary valve includes a rotatable disk having a ramped projection for engaging the tapered valve body. An overrunning clutch is joined to or integral with a lower portion of the tapered valve body to permit rotation of the tapered valve body in only a single direction. When rotating in the first direction, the rotatable disk pushes tangentially on the upper surface of the rotary valve and rotates the valve body in the first direction. Once the tapered valve body is rotated in the first direction by the desired amount, the rotatable disk rotates in the opposite direction. The tapered valve body is prevented from rotating in this opposite direction by the overrunning clutch and is instead driven axially within a valve housing by operation of the ramped projection to compress the sealing members against the interior of the valve housing.

In another embodiment, the rotatable disk and the overrunning clutch are omitted, and the rotary valve instead includes inter-engaging camming surfaces on an axial surface of the tapered valve body and an axial surface of the valve housing. The tapered valve body of this embodiment is bi-directional and is driven by an input shaft extending through the valve housing. Rotation of the tapered valve body within the valve housing causes the camming surfaces to slide over each other and axially displace the tapered valve body against a spring element, such that sealing members between the tapered valve body and the valve housing are at least partially uncompressed during rotation of the tapered valve body within the valve housing.

In these and other embodiments, the tapered valve body includes at least one flow passage extending transverse to a rotational axis of the tapered valve body. The tapered valve body can include a single flow passage in some embodiments, while in other embodiments the tapered valve body includes two or more flow passages. The flow passage or passages can be straight, "L" shaped, "T" shaped, or "X" shaped for connecting two, three, or four ports in the valve housing. The sealing members can include a sealing element, for example an o-ring, surrounding the entrance/exit of each flow passage. In addition, the spring element can include a helical compression spring positioned between an axial surface of the tapered valve body and a portion of the valve housing.

The rotary valve of these and other embodiments decouples the proportional relationship between the sealing ability of the rotary valve and the associated torque demand. The rotary valve provides low resistance to rotation from state to state, simplifies actuator demand, and maintains a strong seal to prevent coolant leakage. The rotary valve can achieve a longer service life when compared to existing, high-torque rotary valves, and the rotary valve can be readily adapted for a wide variety of multi-port configurations for cooling circuits and other systems.

These and other features and advantages of the present invention will become apparent from the following description of the invention, when viewed in accordance with the accompanying drawings and the appended claims. It will be appreciated that any of the preferred and/or optional features of the invention may be incorporated alone, or in appropriate combination, within embodiments of the invention, while still falling within the scope of claim 1, even if such combinations are not explicitly claimed in the appended claims.

DETAILED DESCRIPTION OF THE PRESENT EMBODIMENTS

Figure 1:
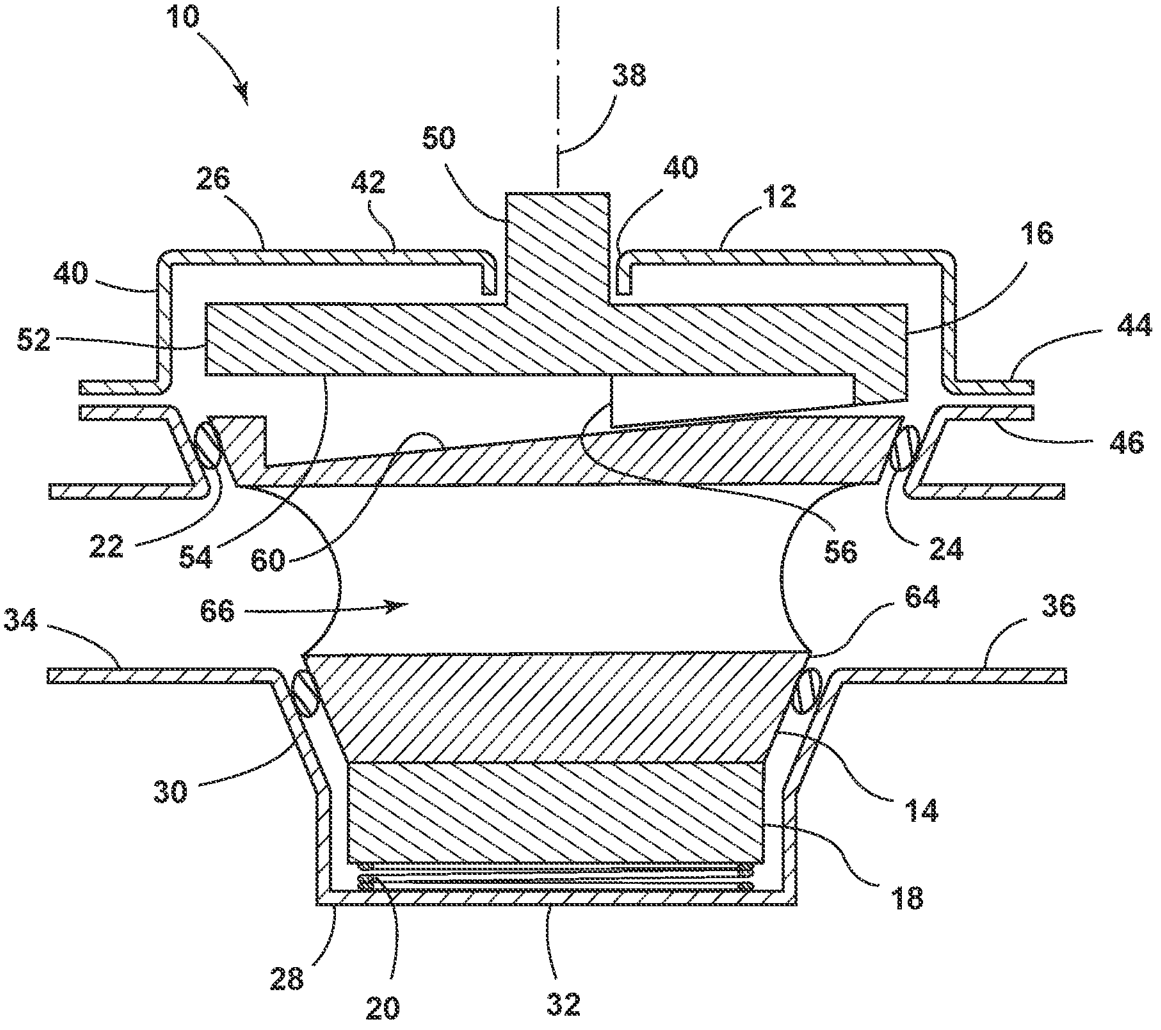
FIG. 1 is a cross-sectional view of a rotary valve in accordance with a first embodiment of the invention.
Figure 2:
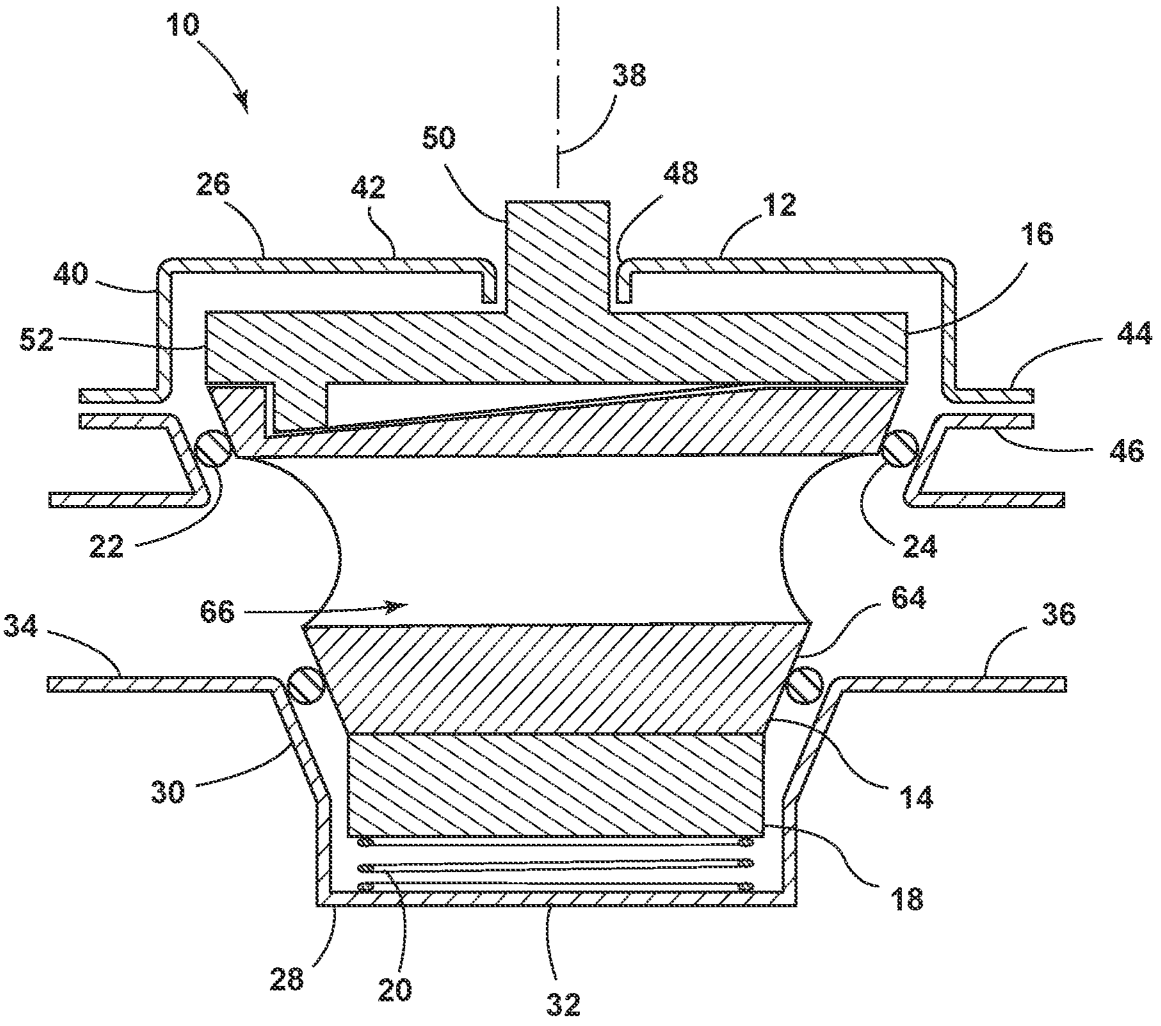
FIG. 2 is a cross-sectional view of the rotary valve of FIG. 1 in which the sealing members are uncompressed.
Figure 3:
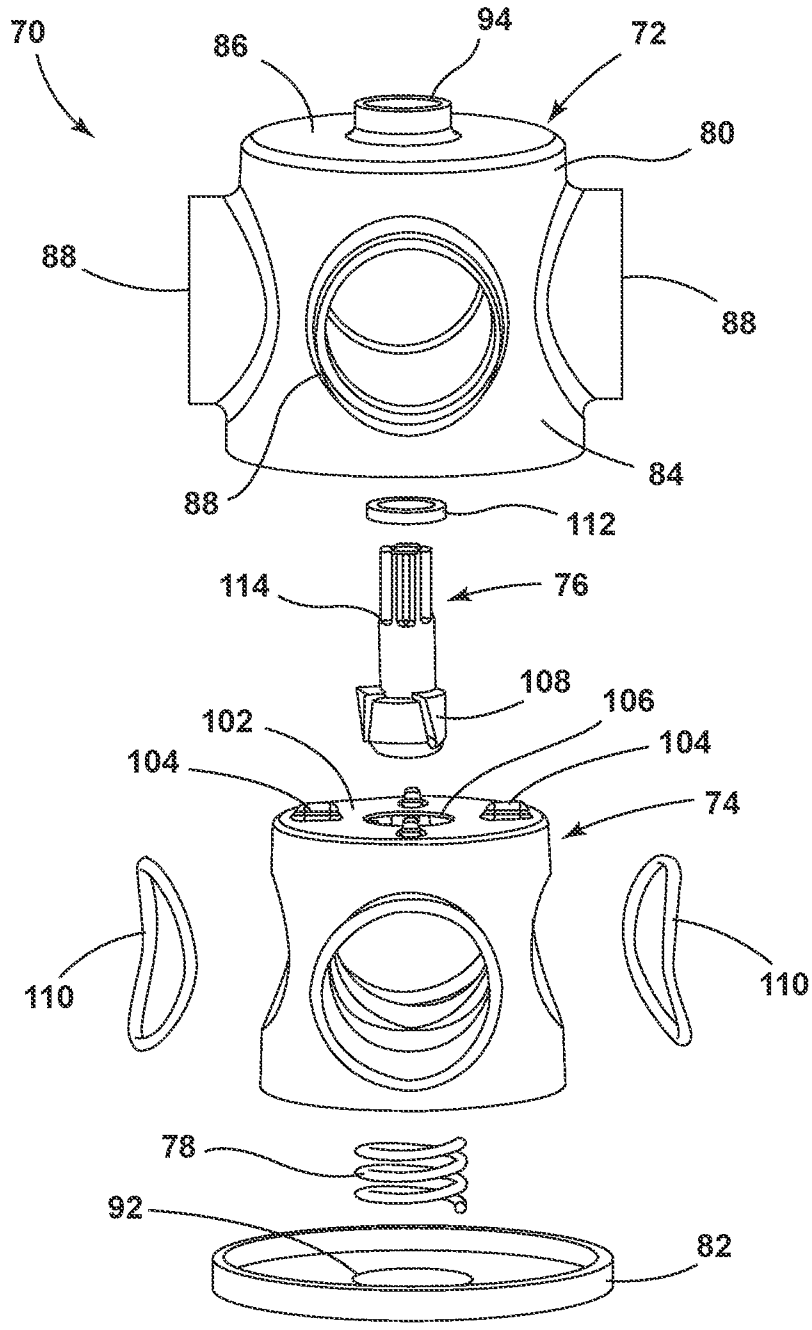
FIG. 3 is an exploded view of a rotary valve in accordance with a second embodiment of the invention.

Referring to FIGS. 1-2, a multi-port rotary valve in accordance with a first embodiment is illustrated and generally designated 10. The rotary valve 10 includes a valve housing 12 containing a tapered valve body 14, a rotatable disk 16, and a rotatable clutch 18. As discussed below, the tapered valve body 16 is lifted by action of a spring 20 during rotation of the rotatable disk 16 in a first direction and thereafter seated after the rotatable disk 16 is counter-rotated. The rotatable clutch 18 prevents the valve body 14 from rotating in the opposite direction. Because the tapered valve body 14 is lifted during rotation, the sealing members 22, 24 are uncompressed, and a lower torque demand is required, thereby allowing for a smaller and less costly motor actuator. Each such feature of the rotary valve 10 is discussed below.

The valve housing 12 generally includes an upper housing 26 and a lower housing 28 that collectively define an enclosure for the tapered valve body 14, the rotatable disk 16, the rotatable clutch 18, and the spring 20. The lower housing 28 includes a tapered sidewall 30 extending upwardly and outwardly from a lower end-wall 32. The tapered sidewall 30 includes at least one inlet port 34 and at least one outlet port 36. The inlet port 34 and the outlet port 36 each define a flow passage that is generally orthogonal to the rotational axis 38 of the tapered valve body 14. While two ports are shown in the FIGS. 1-2, in other embodiments a greater number of inlet ports and/or outlet ports can be used in other embodiments. In still other embodiments, the ports are bi-directional, such that any given port can function as both an inlet port and an outlet port, dependent on the orientation of the tapered valve body 14 within the valve housing 12.

The upper housing 26 includes a cylindrical sidewall 40 extending downward from an upper end-wall 42. The upper and lower housing 26, 28 include respective flanges 44, 46 that are joined to each other according to any suitable method to provide a liquid-tight seal about the periphery of the valve housing 12. For example, the upper flange 44 can be ultrasonically welded to the lower flange 46, while in other embodiments the upper flange 44 is secured to the lower flange 46 via a plurality of fasteners that extend into aligned openings in the respective flanges 44, 46. Because the housing 12 is tapered, the upper end-wall 42 includes an outer diameter that is greater than the outer diameter of the lower end-wall 32. In addition, the upper end-wall 42 includes a central aperture 48 for a stem 50 extending upwardly from the rotatable disk 16.

The rotatable disk 16 includes a head 52 fixedly joined to the aforementioned stem 50. The stem 50 is adapted to transfer torque from a motor actuator to the head 52 of the rotatable disk 16. The rotatable disk 16 includes an axis of rotation that is concentric with the rotational axis 38 of the tapered valve body 14. The head 52 is disk-shaped and includes a lower surface 54 having at least one ramped projection 56. The ramped projection 56 makes sliding contact with a corresponding ramped projection 60 on the tapered valve body 14 while rotating to impart axial motion to the tapered valve body 14. Each ramped projection includes a uniform pitch, such that the ramped projection gradually increases from a minimum height to a maximum height. The pitch is approximately 15 degrees in the illustrated embodiment but can be greater than or less than 15 degrees in other embodiments. For n-number of ramped projections, each projection spans approximately 360/n degrees in the circumferential direction. For example, if the rotatable disk 16 includes two ramped projections, each ramped projection spans approximately 180 degrees in the circumferential direction. If the rotatable disk 16 includes three ramped projections, each ramped projection spans approximately 120 degrees in the circumferential direction. If the rotatable disk 16 includes four ramped projections, each ramped projection spans approximately 90 degrees. Still greater number of ramped projections can be used in other embodiments. In other embodiments the ramped projections are asymmetrically disposed about the exterior of the rotatable disk 16, such that at least two of the ramped projection sweep through a different angular range, e.g., one projection spanning 270 degrees and the other projection spanning 90 degrees.

As also shown in FIGS. 1-2, the tapered valve body 14 includes a sloped outer surface 64. The sloped outer surface 64 is V-shaped and increases in diameter in the vertical direction when viewed from the side (i.e., the diameter of the sloped outer surface 64 increases along the height of the tapered valve body 14). The tapered valve body 14 includes at least one flow-passage 66 therethrough, the flow passage 66 being transverse to the rotational axis 38 of the tapered valve body 14. While a single flow-passage 66 is shown in FIGS. 1-2, in other embodiments the tapered valve body 14 includes two, three, or more flow passages.

As noted above, the tapered valve body 14 includes an upper surface having at least one ramped projection 60. The ramped projection(s) 60 of the tapered valve body 14 make sliding contact with ramped projection(s) 56 of the rotatable disk 16. Each ramped projection 60 of the tapered valve body 14 includes a uniform pitch, such that the ramped projection gradually increases from a minimum height to a maximum height. The pitch is approximately 15 degrees in the illustrated embodiment but can be greater than or less than 15 degrees in other embodiments. As with the rotatable disk 16, the tapered valve body 14 can include n-number of ramped projections that span 360/n degrees in the circumferential direction. Further optionally, the ramped projections of the tapered valve body 14 can be asymmetrically disposed, such that at least two of the ramped projection sweep through a different angular range, e.g., one projection spanning 270 degrees and the other projection spanning 90 degrees.

As also shown in FIGS. 1-2, the rotary valve 10 includes a rotatable clutch 18 and a spring element 20. The spring element 20 is adapted to bias the valve body 14 upwardly against the rotatable disk 16. The rotatable disk 16 is constrained in the vertical direction but has rotational freedom when driven by a rotary actuator. The spring element 20 is a helical compression spring in the illustrated embodiment but can include other spring elements in other embodiments. The rotatable clutch 18 is coupled to the lower extent of the tapered valve body 14 and is adapted to permit rotation of the tapered valve body 14 in only a single direction (e.g., clockwise or counter-clockwise). The present invention is not limited to a particular rotatable clutch (also referred to as an overrunning clutch). Examples include a ratchet clutch, a sprag clutch, a compliant clutch, and a roller clutch. Still other rotatable clutches can be used in other embodiments.

In operation, the tapered valve body 14 is lifted and rotated during rotation of the rotatable disk 16 in a first direction and thereafter seated after the rotatable disk 16 is counter-rotated. As shown in FIG. 1 for example, the sealing members 22, 24 are initially compressed between the tapered valve body 14 and the tapered sidewall 30. Rotation of the rotatable disk 16 in the counter-clockwise direction causes the tapered valve body 14 to travel vertically by action of the compression spring 20. FIG. 2 depicts the seals 22, 24 in the uncompressed state. The valve body 14 rotates in unison with the rotatable disk 16 in the counter-clockwise direction, as the rotatable disk 16 remains frictionally engaged with the tapered valve body 14. After the tapered valve body 14 is rotated by the desired amount, the rotatable disk 16 reverses direction. The ramped projection 56 of the rotatable disk 16 drives the valve body 14 downward, against the spring 20, thereby compressing the seals 22, 24 surrounding each port 34, 36, while the rotatable clutch 18 prevents the rotation of the tapered valve body 14 in the reverse direction.

Referring now to FIGS. 3-6, a multi-port rotary valve in accordance with a second embodiment is illustrated and generally designated 70. The rotary valve 70 of FIGS. 3-6 is structurally and functionally similar to the rotary valve 10 of FIGS. 1-2, except that ramped projections of the rotatable disk are integrally formed with the upper housing. The rotatable clutch is also omitted, as this embodiment allows for bi-directional rotation of the valve body.

More specifically, the rotary valve 70 of FIGS. 3-6 includes a valve housing 72, a tapered valve body 74, an input shaft 76, and a spring element 78. The valve housing 72 includes an upper housing 80 and a lower housing 82 that cooperate to define an enclosure for the tapered valve body 74. The upper housing 80 includes a tapered sidewall 84 extending downwardly and outwardly from an upper end-wall 86. The tapered sidewall 84 includes four ports 88 that each define a flow passage that is generally orthogonal to the rotational axis 90 of the tapered valve body 74. While four ports 88 are shown in the FIGS. 3-6, in other embodiments the valve housing 72 can include a different number of ports. The lower housing 82 includes a cover having a spring seat 92 for the spring element 78. The upper end-wall 86 includes a central aperture 94 for the input shaft 76, shown in FIG. 3. The upper and lower housings 80, 82 are joined to each other according to any suitable method. Because the upper housing 80 is tapered, the upper end-wall 86 includes an outer diameter that is less than the outer diameter of the lower housing 82.

Figure 4:
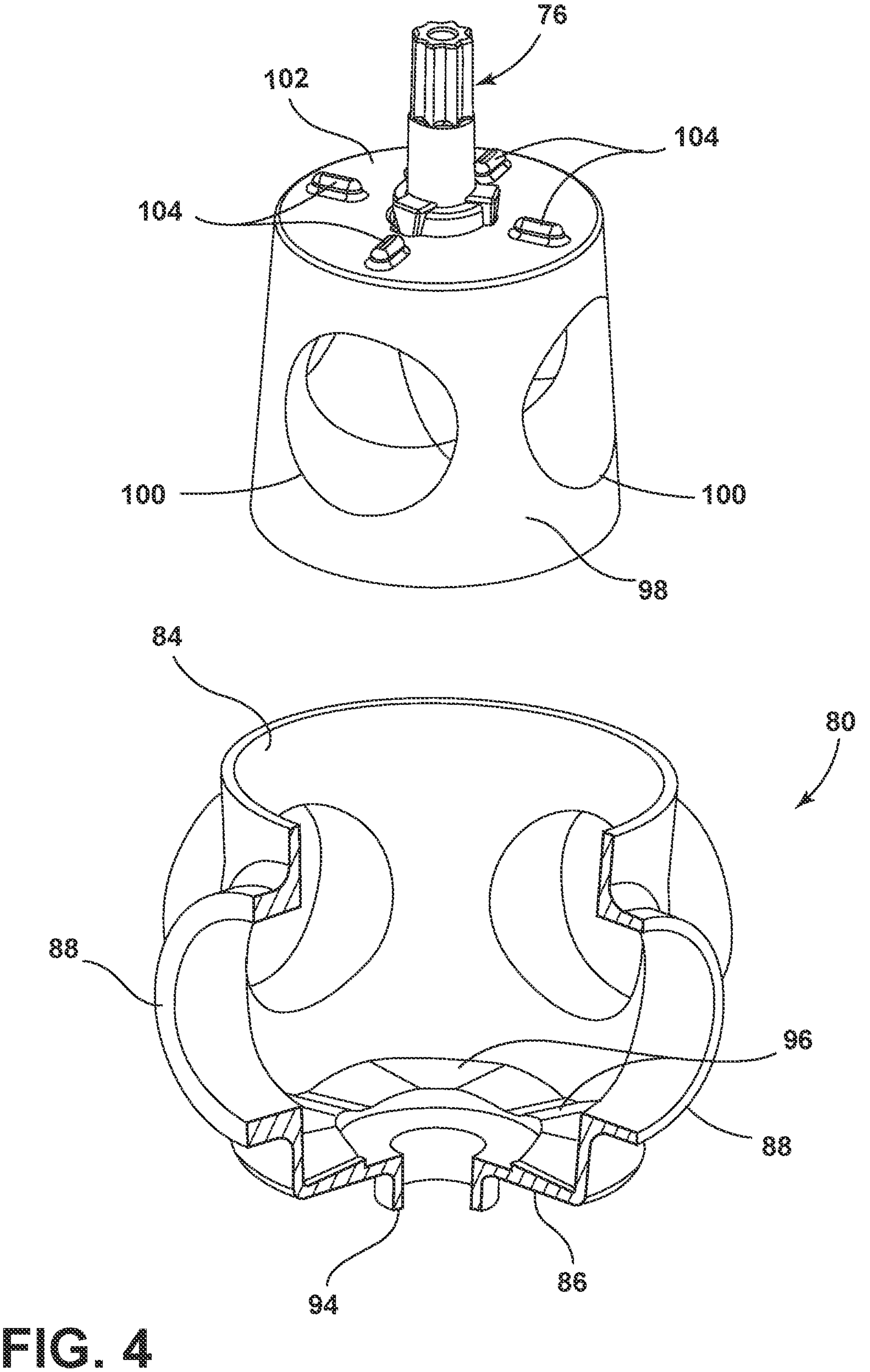
FIG. 4 is a perspective view of a tapered valve body and a partially exploded view of a valve housing.

An inverted view of interior of the upper housing 80 is shown in FIG. 4. The upper housing 80 includes a repeating series of ramped projections 96—optionally configured as an undulating camming surface—that extend around the circumference of the upper-end wall 86. The tapered valve body 74 and the input shaft 76 are also shown in FIG. 4. The tapered valve body 74 includes a sloped outer surface 98. The valve body 74 is frustoconical and narrows in the vertical direction (i.e., the diameter of the sloped outer surface 98 decreases along the height of the valve body 74). The tapered valve body 74 includes at least one flow-passage 100 therethrough, the at least one flow passage 100 being transverse to the rotational axis 90 of the tapered valve body 74. While the tapered valve body 74 includes a "X" shaped channel for connecting four ports 88, the tapered valve body 74 can alternatively include a single "L" shaped channel for connecting two ports, a single "T" shaped channel for connecting three ports, or two "L" shaped channels for connecting four ports, each being transverse to (and optionally intersecting) the rotational axis 90 of the tapered valve body 74. Other configurations are possible in other embodiments.

The upper surface 102 of the valve body 74 also includes a plurality of discontinuous projections 104 that are spaced apart from each other. The projections 104 extend vertically from the upper surface 102 of the valve body 74 and engage the ramped projections 96 in the housing 72. For n-number of projections, each projection is spaced apart from the adjacent projections by approximately 360/n degrees. For example, if the valve body 74 includes four projections as shown in FIG. 4, each projection is spaced apart from the adjacent projection by approximately 90 degrees. In still other embodiments, the projections are asymmetrically disposed about the upper surface 102 of the valve body 74, such that the spacing between adjacent projections varies. While four projections are shown in FIG. 4, greater or fewer number of projections can be included in other embodiments. In an alternative embodiment, the housing 72 can include the discontinuous projections 104 while the valve body 74 includes the ramped projections 96. In still an alternative embodiment, each of the housing 72 and the valve body 74 includes ramped projections substantially as discussed in connection with FIGS. 1-2 above.

As noted above, the rotary valve 70 also includes an input shaft 76. The input shaft 76 extends through the central opening 94 in the upper valve housing 80. The input shaft 76 is rotatable in the clockwise and counter-clockwise directions, and the valve body 74 rotates in unison with the input shaft 76. The valve body 74 includes a socket opening 106 (visible in FIG. 3) that receives the head 108 of the input shaft 76. The socket opening 106 and the head 108 include a matching geometry such that that rotation of the input shaft 76 causes a corresponding rotation of the valve body 74. The tapered valve body 74 is free to oscillate axially relative to the input shaft 76 while remaining engaged with the input shaft 76.

Rotation of the tapered valve body 74 relative to the valve housing 80 causes the projections 104 on the upper surface 102 of the tapered valve body 74 to engage the undulating camming surface 96 on the underside of the upper-end wall 86. The camming surface 96 causes the tapered valve body 74 to displace axially, thereby decompressing the sealing members 110 (e.g., o-rings) surrounding the channel openings 100 in the tapered valve body 74.

Figure 5:
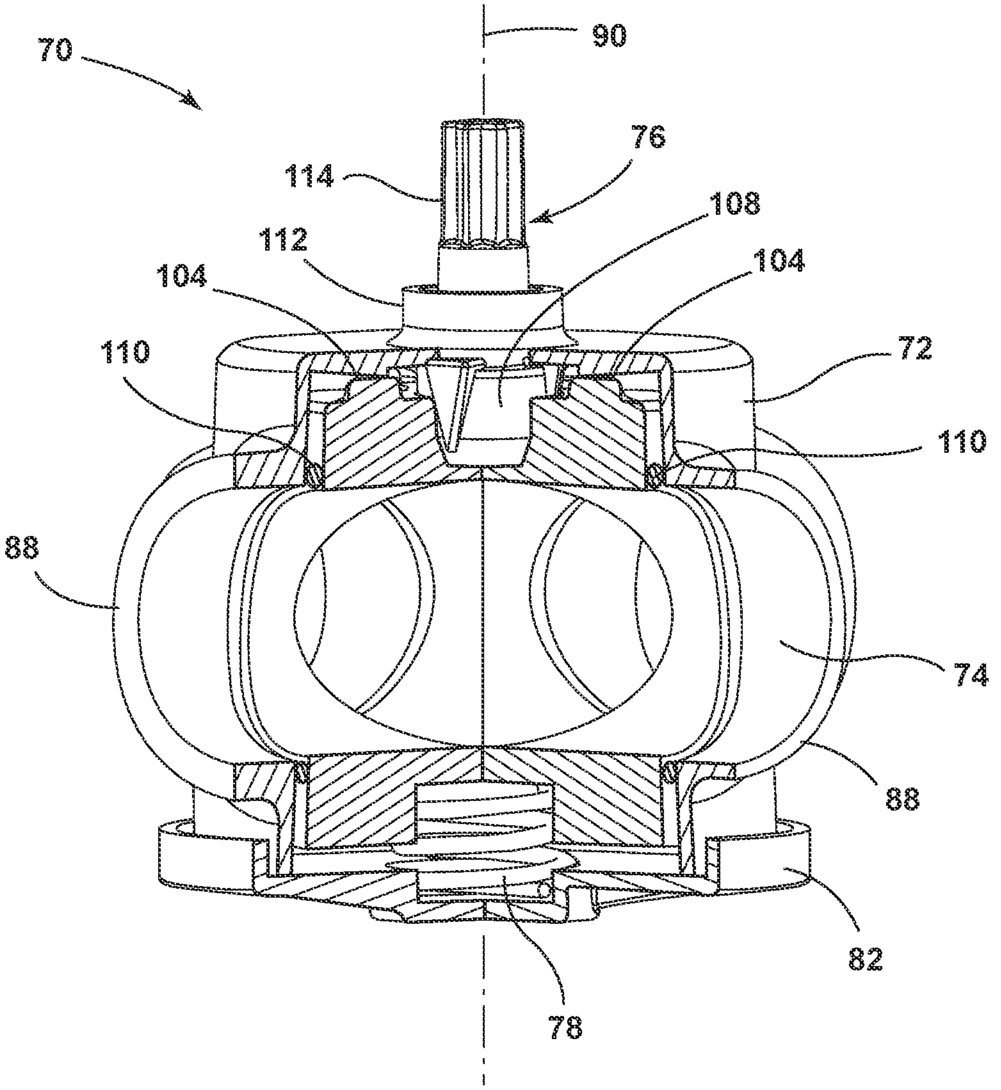
FIG. 5 illustrates the rotary valve of FIG. 3 in which the tapered valve body is in a first rotational position.
Figure 6:
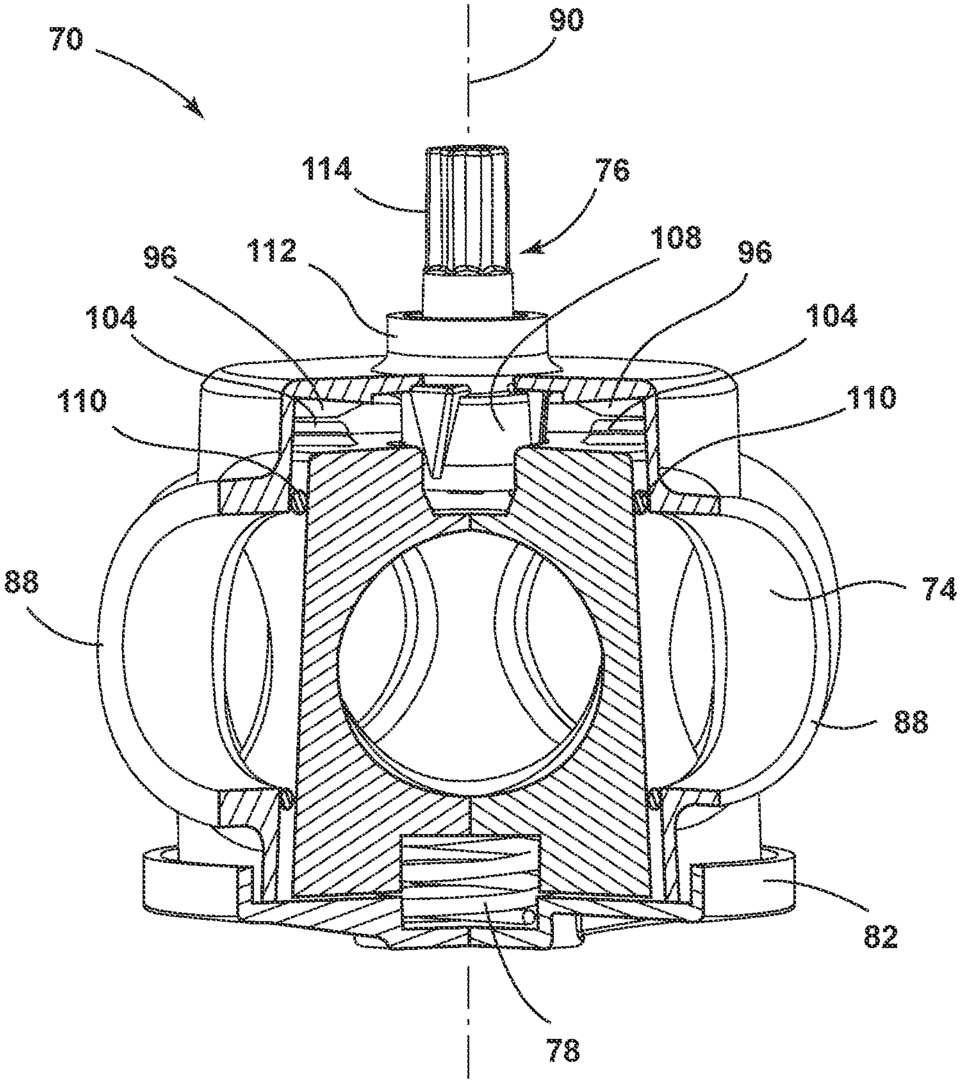
FIG. 6 illustrates the rotary valve of FIG. 3 in which the tapered valve body is in a second rotational position.

In a first position as shown in FIG. 5, the tapered valve body 74 is lifted by action of the spring element 78, and the sealing members 110 are compressed between the tapered valve body 74 and the valve housing 72. A compressible shaft seal 112 extends around the stem 114 of the input shaft 76 to prevent the escape of fluid from the rotary valve 70. Rotation of the input shaft 76 in the clockwise or counter-clockwise direction causes the tapered valve body 74 to travel axially downward against the spring element 78. FIG. 6 depicts the sealing members 110 in the uncompressed state, caused by the downward travel of the valve body 74. After the valve body 74 is rotated by the desired amount, such that the channel openings 100 are aligned with the input/output ports 88, the input shaft 76 stops rotating. The spring element 78 drives the valve body 74 upward, thereby compressing the sealing members 110 around the channel openings 100.

Figure 7:
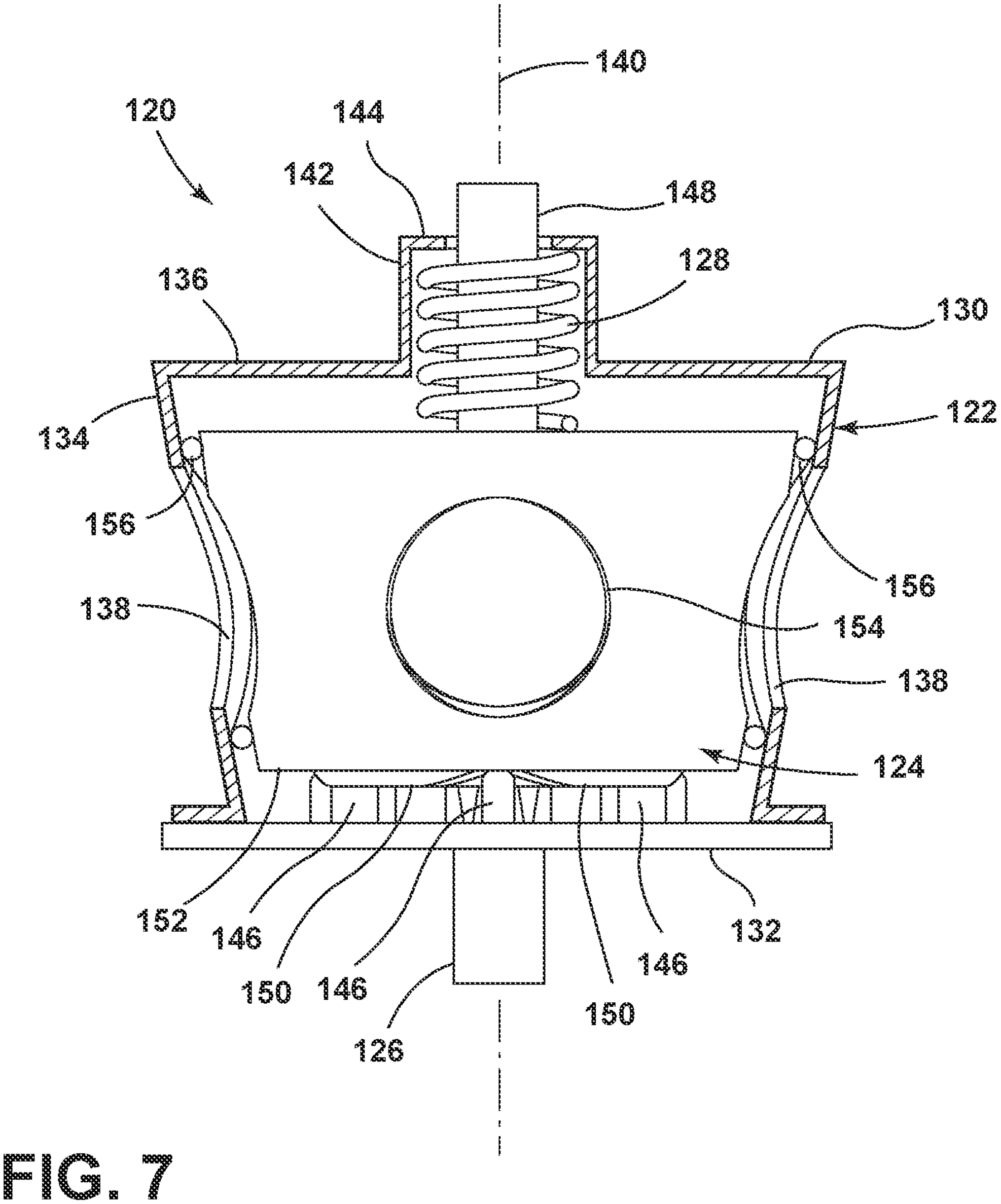
FIG. 7 is a cut-away view of a rotary valve in accordance with a third embodiment of the invention.
Figure 8:
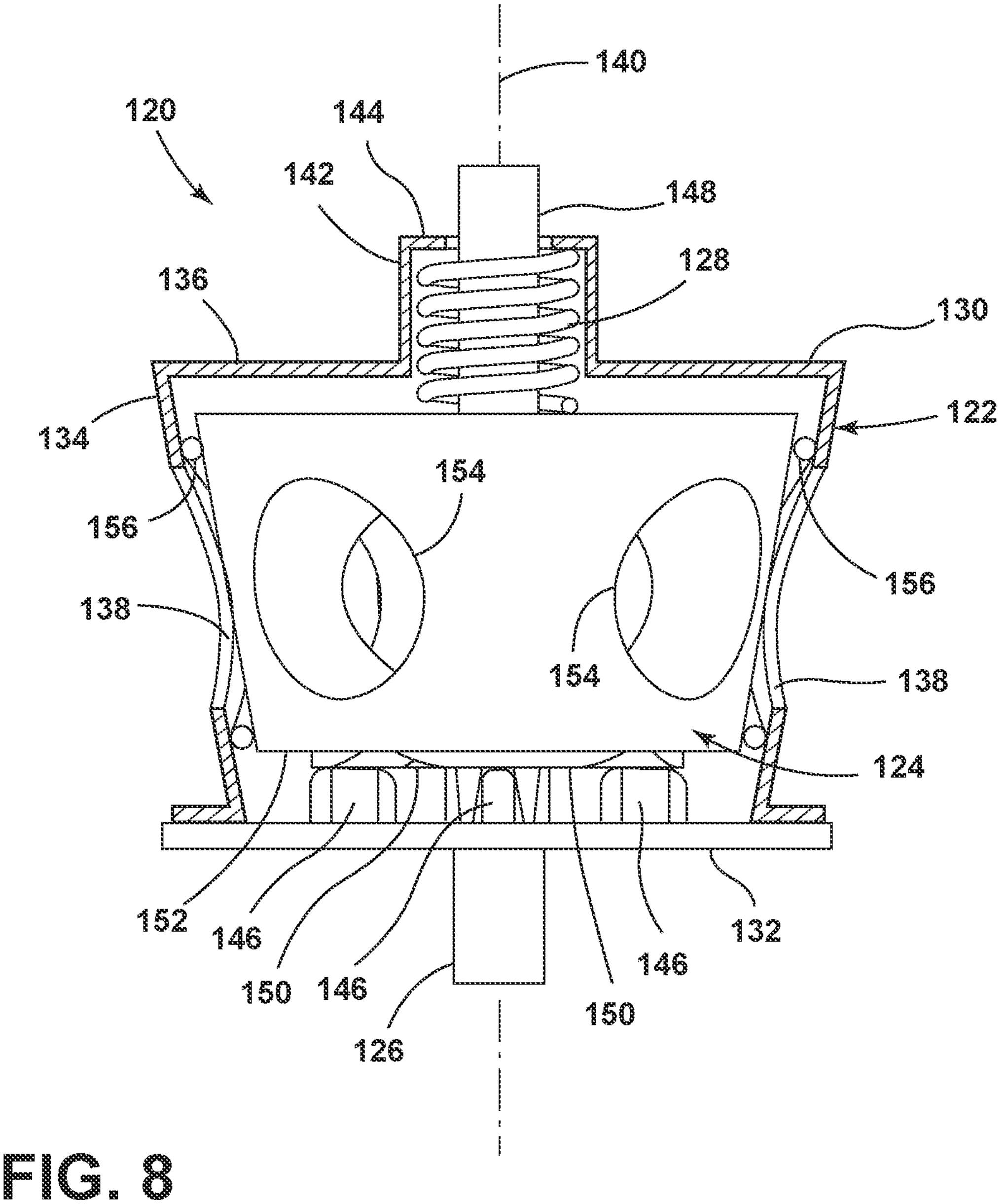
FIG. 8 illustrates the rotary valve of FIG. 9 in which the tapered valve body is a second rotational position.

Referring now to FIGS. 7-8, a multi-port rotary valve in accordance with a third embodiment is illustrated and generally designated 120. The rotary valve 120 of FIGS. 7-8 is structurally and functionally similar to the rotary valve 70 of FIGS. 3-6, except that the undulating camming surface is integrally formed with the valve body, rather than the valve housing. The spring element biases the tapered valve body downwardly, and the rotatable clutch is omitted (similar to FIGS. 3-6) to also allow for bi-directional rotation of the valve body.

More specifically, the rotary valve 120 of FIGS. 7-8 includes a valve housing 122, a tapered valve body 124, an input shaft 126, and a spring element 128. The valve housing 122 includes an upper housing 130 and a lower housing 132 that cooperate to define an enclosure for the tapered valve body 124. The upper housing 130 includes a tapered sidewall 134 extending downwardly and inwardly from an upper end-wall 136. The tapered sidewall 134 includes four ports 138 that each define a flow passage that is generally orthogonal to the rotational axis 140 of the tapered valve body 124. While four ports 138 are shown in the FIGS. 7-8, in other embodiments the valve housing 122 can include a different number of ports.

The upper housing 130 also includes an upwardly extending cylindrical sleeve 142. The cylindrical sleeve 142 includes an annular lip 144 that provides a seat for the spring element 128, which extends around a stem 148 protruding upwardly from the valve body 124. The lower housing 132 includes a plurality of discontinuous projections 146 that are spaced apart from each other about the circumferences of the lower housing 132. For n-number of projections, each projection is spaced apart from the adjacent projections by approximately 360/n degrees. For example, if the lower housing 132 includes four projections as shown in FIGS. 7-8, each projection is spaced apart from the adjacent projection by approximately 90 degrees. In still other embodiments, the projections are asymmetrically disposed about the lower housing 132, such that the spacing between adjacent projections varies.

The tapered valve body 124 is frustoconical and widens in the vertical direction (i.e., the outer diameter of the tapered valve body 124 increases along its height). As noted above, the tapered valve body 124 includes a camming surface 150 comprising a repeating series of undulations that extend around the circumference of the downward facing surface 152 of the tapered valve body 124. The tapered valve body 124 also includes at least one flow-passage 154 therethrough, the at least one flow passage 154 being transverse to the rotational axis 140 of the tapered valve body 124. While the tapered valve body 124 includes a "X" shaped channel in the illustrated embodiment, the tapered valve body 124 can alternatively include a single "L" shaped channel, a single "T" shaped channel, or two "L" shaped channels. Other configurations are possible in other embodiments.

In a first position as shown in FIG. 7, the valve body 124 is biased downward by action of the spring element 124, and the sealing members 156 are initially compressed between the tapered valve body 124 and the housing valve housing 122. Rotation of the input shaft 126 in the clockwise or counter-clockwise direction causes the tapered valve body 124 to travel axially upward against the spring element 128 by action of the camming surface 150 against the projections 146. FIG. 8 depicts the sealing members 156 in the uncompressed state. After the tapered valve body 124 is rotated by the desired amount, such that the channel openings 154 are aligned with the input/output ports 138, the input shaft 126 stops rotating. The spring element 128 drives the valve body 124 downward, thereby compressing the sealing members 156.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A multi-port rotary valve comprising:

a tapered valve body defining at least one flow passage between first and second openings, the flow passage extending transverse to a rotational axis of the tapered valve body, the tapered valve body further including an upper axial surface defining a socket opening and including a lower axial surface defining a diameter that is greater than a diameter defined by the upper axial surface, the socket opening extending partially into the tapered valve body such that the socket opening defines a base that is recessed from the upper axial surface of the tapered valve body;

a valve housing including an upper housing and a lower housing, the upper housing including at least one inlet port and at least one outlet port and including an aperture in vertical alignment with the socket opening of the tapered valve body, the lower housing being joined to the upper housing and defining a spring seat for a spring element, the spring element being compressed between the spring seat of the lower housing and the tapered valve body and being co-axial with the rotational axis of the tapered valve body, such that the tapered valve body is biased in an upward axial direction by the spring element;

first and second sealing members adjacent the first and second openings in the tapered valve body for sealing the tapered valve body against the valve housing;

an input shaft extending through the aperture in the valve housing and including a head that is received within the socket opening in the tapered valve body, the head of the input shaft and the socket opening having matching radial surfaces such that rotation of the input shaft about the rotational axis causes a corresponding rotation of the valve body, the tapered valve body being axially moveable relative to the input shaft while remaining rotatively coupled to the input shaft;

wherein the upper axial surface of the tapered valve body includes a first projection and wherein an axial surface of the upper housing includes a second projection, the upper axial surface of the tapered valve body being opposite of the axial surface of the upper housing, the first projection being integrally formed with the tapered valve body and the second projection being integrally formed with the upper housing;

wherein rotation of the input shaft about the rotational axis causes rotation of the tapered valve body within the valve housing due to the matching radial surfaces of the head of the input shaft and the socket opening, and wherein rotation of the tapered valve body within the valve housing causes the first projection to slide over the second projection and axially displace the tapered valve body downward relative to the input shaft and against the spring element, such that the first and second sealing members are at least partially uncompressed during rotation of the tapered valve body within the valve housing.

2. The rotary valve of claim 1, wherein at least one of the first and second projections include an undulating surface.

3. The rotary valve of claim 1, wherein the first projection comprises one of a plurality of projections that are spaced circumferentially about the upper axial surface of the tapered valve body.

4. The rotary valve of claim 3, wherein the second projection comprises an undulating surface that is circumferentially disposed about the upper axial surface of the valve housing.

5. The rotary valve of claim 1, wherein the tapered valve body includes a frustoconical sidewall, the first and second openings being defined in the frustoconical sidewall.

6. The rotary valve of claim 1, wherein the first and second sealing members are o-rings that are aligned with and that encircle the first and second openings, respectively.

7. The rotary valve of claim 1, wherein the flow passage includes an L-shaped flow passage, and X-shaped flow passage, or a T-shaped flow passage extending through the tapered valve body.

8. The rotary valve of claim 1, wherein at least one of the first and second projections include a ramped surface.

* * * * *